United States Patent
Okada et al.

(10) Patent No.: US 6,322,629 B1
(45) Date of Patent: Nov. 27, 2001

(54) APPARATUS AND METHOD FOR COATING AN ANNULAR ARTICLE

(75) Inventors: Shinichiro Okada; Hideo Inuta, both of Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/584,383

(22) Filed: May 31, 2000

(30) Foreign Application Priority Data

Jun. 1, 1999 (JP) .................................................. 11-153160

(51) Int. Cl.[7] .............................. B05C 13/00; B05B 5/12; A47F 5/025; H02K 1/18
(52) U.S. Cl. .......................... 118/503; 118/621; 118/622; 211/1.53; 211/182
(58) Field of Search .................................... 118/621, 622, 118/317, 318, 308, DIG. 10, 500, 503; 211/1.53, 4, 123, 124, 182, 183

(56) References Cited

U.S. PATENT DOCUMENTS

| 3,311,085 | * | 3/1967 | Smith | 118/59 |
| 5,540,776 | * | 7/1996 | Habsburg-Lothringen | 118/634 |
| 6,056,821 | | 5/2000 | Nihongi . | |

FOREIGN PATENT DOCUMENTS

| 60-193560 | 10/1985 | (JP) . |
| 1-13573 | 4/1989 | (JP) . |
| 10-145988 | 5/1996 | (JP) . |
| 10-145994 | 5/1996 | (JP) . |

* cited by examiner

Primary Examiner—Richard Crispino
Assistant Examiner—Yewebdar T. T.
(74) Attorney, Agent, or Firm—Burns, Doane, Swecker & Mathis, LLP

(57) ABSTRACT

An apparatus and method for coating electrostatically charged powder on a ring-shaped article having an inner surface defining a central hole. The article to be coated is held by a holding fixture while electrostatic powder is being sprayed onto the surface of the article. The holding fixture includes a first fixture having a plurality of holding hooks circularly arranged and elastically deformable radially, and a second fixture having a rod, the first and second fixtures being inserted through the central hole of the article from opposite sides to engage each other, with the rod engaging the holding hooks to elastically deform the hooks and bring them into abutment with the inner surface of the article. The powder ejected from the spray reach not only the outer surface, but also the internal surface of the ring shaped article because the central hole is not blocked or covered by the holding fixture, and a space is left between the ring shaped article and the end surfaces of the holding fixture.

15 Claims, 8 Drawing Sheets

APPARATUS AND METHOD FOR COATING AN ANNULAR ARTICLE

CROSS-REFERENCE TO RELATED APPLICATION

This application claims the benefit of the filing date of Japanese Patent Application No. 11-153160, filed in Japan on Jun. 1, 1999, under 35 U.S.C. § 119. The entire content of the Japanese application is hereby incorporated by reference.

BACKGROUND OF THE INVENTION

1. Field of the Invention

The present invention relates to an electrostatic coating apparatus, which coats an annular article such as a stator core or a driving magnet for an electric motor with electrostatically charged powder, and it pertains to a method for electrostatically coating such an annular article. The present invention also relates to a fixture for holding an annular article for such electrostatic powder coating.

2. Description of the Related Art

Japanese Laid-Open Patent Application No. 60-193560 discloses an electrostatic coating apparatus for coating an armature of an electric motor with electrostatic powder. The electrostatic coating apparatus comprises a chain conveyor for transporting the core to be coated along a transporting path and an electrostatic spray station disposed half way of the transporting path to apply electrostatically charged powder onto the armature. The apparatus also comprises a fixture for holding or supporting the core. The holding fixture is formed of a pair of conductive metallic cylindrical columns, each cylindrical column having a central hole or bore which is open at one end of the column. Both ends of a holding shaft fixed to the center of the armature are detachably fitted to the central holes, respectively. The armature is transported by the chain conveyor along the transporting path with the armature rotating with the cylindrical columns of the holding fixture. While the armature passes through the electrostatic spray station, electrostatically charged powder of solid particulated material are ejected onto the armature to coat the armature with the powder.

However, the aforementioned conventional coating apparatus cannot coat the portion of the armature covered by the holding fixture because the powder cannot reach there, while the exposed portions outside of the holding fixture can be coated. Moreover, since the holding fixture is formed to hold the shaft of the armature, a hollow annular article such as a stator core of an outer-rotor-type spindle motor cannot be held by the holding fixture of the conventional apparatus. When the holding shaft is fitted in the inner diameter of the core, the core can be held thereby. However, the interior surface of the core cannot be coated.

Furthermore, it may be sometimes desirable that the thickness of the coating is changed at portions of the core. As disclosed in Japanese Laid-Open Patent Application No. 10-145988, for example, when a stator of a motor opposes a permanent magnet ring with the stator having coils wound around core sections, it is required that the thickness of the coating on the core is made different, complying with the demand for each portion thereof. For example, the coating on the surface of the core opposing the permanent magnet should be thinner than that on a coil winding portion and interior surface of a mounting hole of the core. In the apparatus disclosed in that patent application, the core held by a particular holding fixture is coated two times, with the second coating being applied after a first coating is removed for some portion where the thickness of the coating is required to be thinner. The portion having one layer of the coating (single coated portion) film and the portion having two layers thereof (double coated portion) are thereby formed on a core such that it has different thicknesses of the coating for the different portions of the core. However, since the prior art does not teach how to hold an annular core during the coating such that the entire surface of the core may be coated, it is likely that the coating is uneven in some portions and un-coated in other portions.

SUMMARY OF THE INVENTION

It is an object of the present invention to provide an electrostatic coating apparatus capable of electrostatically coating a desired portion of an annular article.

It is another object of the present invention to provide an electrostatic coating apparatus capable of electrostatically coating the entire surface of an annular article, including the interior surface of an annular article.

It is still another object of the present invention to provide an electrostatic coating apparatus capable of electrostatically coating an annular article to form different thicknesses of the coated layer on different portions of the article.

It is a further object of the present invention to provide an electrostatic powder coating method for coating a desired portion of an annular article.

It is still a further object of the present invention to provide an electrostatic powder coating method for coating the entire surface of an annular article including the interior surface of a central hole of the article.

It is yet a further object of the present invention to provide an electrostatic powder coating method for coating an annular article with the thicknesses of the coating on portions of the article.

It is another object of the present invention to provide a holding fixture for holding an annular article to be coated substantially without covering the surface of the article.

It is further another object of the present invention to provide a holding fixture for holding an annular article to be coated without covering the interior surface thereof.

It is still another object of the present invention to provide a holding fixture for holding an annular article such that a desired portion thereof is electrostatically coated.

It is yet another object of the present invention to provide a holding fixture for holding an annular article such that substantially the entire surface of the article including the interior surface of the article is electrostatically coated.

According to one aspect of the present invention, an electrostatic coating apparatus of the invention comprises a first and second holding fixtures for holding or supporting an annular article to be coated. The first fixture is provided with a plurality of holding hooks which elastically abut against the internal surface of a central hole of the annular article after the hooks are inserted into the central hole of the annular article from one end of the central hole. The second fixture includes a connecting rod for elastically deforming the holding hooks of the first fixture with the connecting rod being inserted into the central hole from the other end thereof to be brought into engagement with the holding hooks. Thus, the annular article is held by the holding fixture, and conveyed to a coating station where a series of treatments including an electrostatic coating is applied while the article is passing through the coating station.

In accordance with another aspect of the present invention, a holding fixture comprises: a first fixture having a plurality of holding hooks which are elastically deformable and is to be inserted into a central hole of an annular article to be coated, from one end to fit loosely thereto; and a second fixture having a connecting rod which is to be inserted into the central hole of the article from the other end thereof to be brought into engagement with the holding hooks to make the latter elastically abut against the internal surface of the article to hold it. The annular article may be a core for a stator of a motor or a driving magnet of the motor for generating a driving force, for example.

In accordance with a further aspect of the present invention, an electrostatic powder coating method for an annular article, comprising the steps of: inserting a plurality of elastic holding hooks of a first fixture into a central hole of the annular article from one end of the annular article; inserting a second fixture into the central hole from the direction opposite from the first fixture so as to be brought into engagement with the holding hooks to make the holding hooks abut against the internal surface defining the central hole of the annular article to hold the annular article; and spraying charged powder onto the annular article held by the holding fixture as mentioned above. Furthermore, according to an embodiment of the present invention, the coated layer or film on a specific region of the article is removed after the entire surface of the annular article is coated. Then, the entire surface of the annular article is coated again so that thickness of the coated film differs with the regions or portions thereof.

BRIEF DESCRIPTION OF THE DRAWINGS

In the drawings appended hereto, like reference numerals refer to like items.

DETAILED DESCRIPTION OF THE PREFERRED EMBODIMENTS

An electrostatic powder coating apparatus for electrostatically coating an annular article, a method for electrostatically coating an annular article, and a holding fixture used in the apparatus and the method for holding an annular article, each according to an embodiment of the present invention, will be described with reference to the attached drawings, in the context of a stator of an outer-rotor-type motor to be electrostatically coated.

Figure 1:
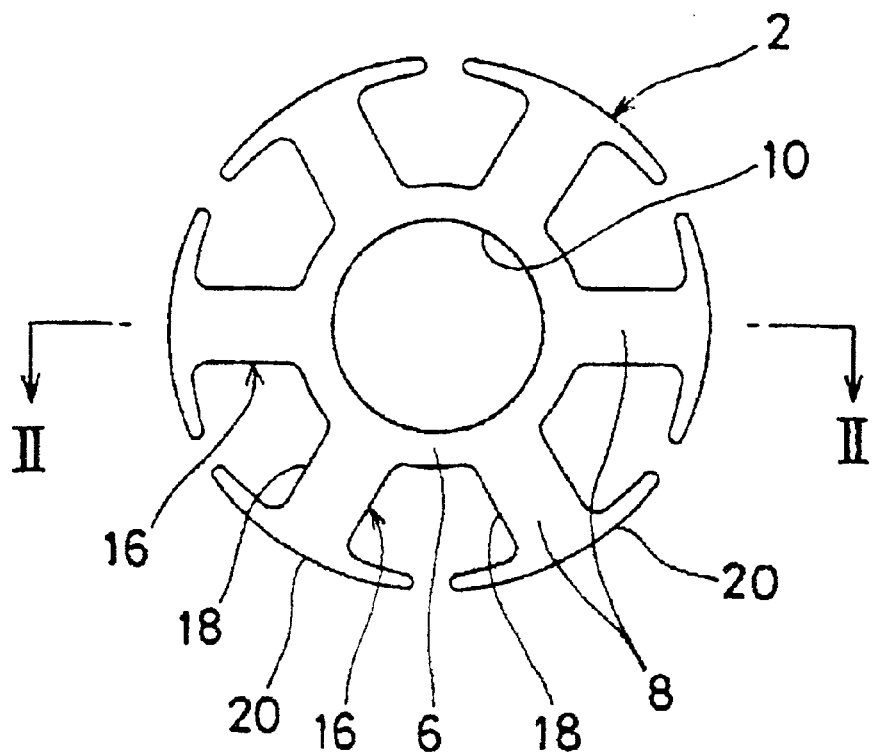
FIG. 1 is a plan view showing a stator core coated by an electrostatic powder coating apparatus according to an embodiment of the present invention.
Figure 2:
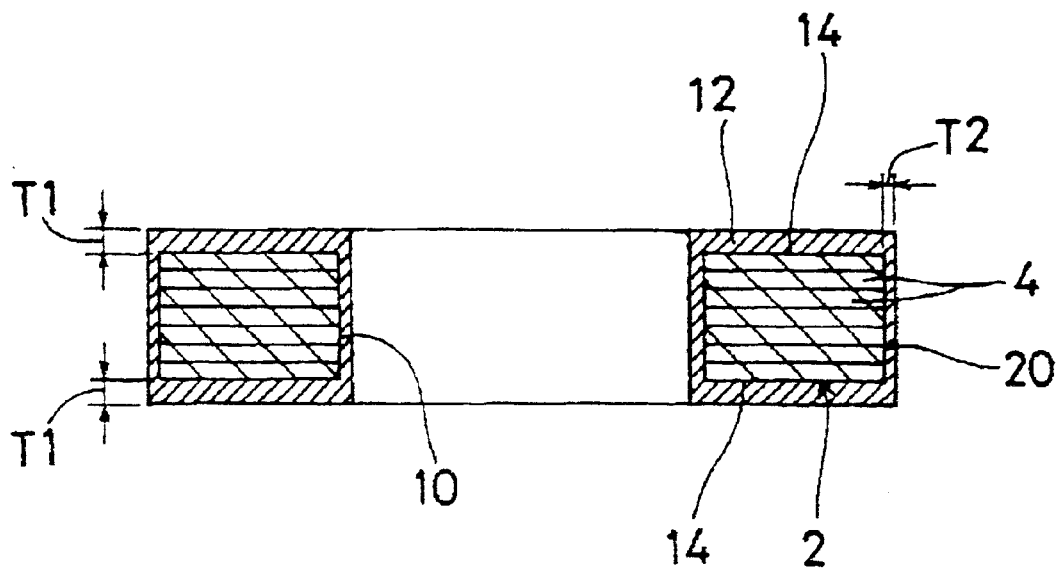
FIG. 2 is a sectional view of the stator core taken along the line II—II of FIG. 1.

An outer-rotor-type permanent magnet motor or DC brtishless spindle motor generally comprises a stator having coils wound around teeth of a stator core and a rotor having permanent magnets radially opposing the stator. As shown in FIGS. 1 and 2, the stator core 2 has generally an annular shape and is composed of a plurality of laminated core plates 4 made of silicon steel sheets. This core is formed of an annular base portion 6 and plural teeth 8 extending outwards from the base portion 6 in the radial directions. Six of the teeth 8, for example, are arranged circumferentially at substantially equal intervals while a central hole 10 is formed in the central portion of the base portion 6 to extend in the direction of lamination of the core plates 4. The stator core 2 is mounted on a hollow cylindrical shaft or column member forming a stationary member of the motor with the cylindrical shaft fitting the central hole 10 (the central hole 10 is referred to as a mounting hole below).

As shown in FIG. 2, the stator core 2 is required to be covered by an electrically insulating film or layer having different thicknesses at different portions of the core. That is, the electrically insulating film or layer 12 should be thicker on both end faces 14 of the base portion 6 and each tooth 8, and surfaces 18 defining slots 16 formed between adjoining teeth 8, than that on the outermost peripheral surface 20 of each tooth 8 to insure electrical insulation between a coil wound around each tooth 8 and the stator core 2, and a rust-proof property of the stator core. In contrast, it is preferable that the electrical insulating coating film 12 on the outermost peripheral surface 20 of each tooth 8 has a smaller thickness than those of the base portion 6, each tooth 8, and the slot defining surface 18 so as to secure a rust-proof property of the stator core 2 while insuring as small a gap as possible between the outermost peripheral surface of the tooth itself and the permanent magnet opposing thereto. For example, it is preferable that the thickness "T1" of the electrical insulating film 12 should be at least 50 to 80 $\mu$m (micrometers), while the thickness "T2" on both end faces 14 of the base portion 6 and each tooth 8, and a surface 18 defining the slot 16 between adjoining teeth 8 of the electrical insulating film 12 on the peripheral surface 20 of each tooth 8 should be 20 to 50 $\mu$m (micrometers).

It is also preferable that the same electrical insulating film 12 as described above be coated on the internal peripheral surface defining the mounting hole 10 formed in the base portion 6 of the stator core 2. This electrical insulating film 12 is formed for securing a rust-proof property of the stator core 2 and for obtaining a buffer or damper effect to absorb or reduce the impact transferred between the stator core 2 and the shaft member (not shown). It is preferable that the thickness of the film or layer there be the same as the above-mentioned thickness "T1".

Figure 3:
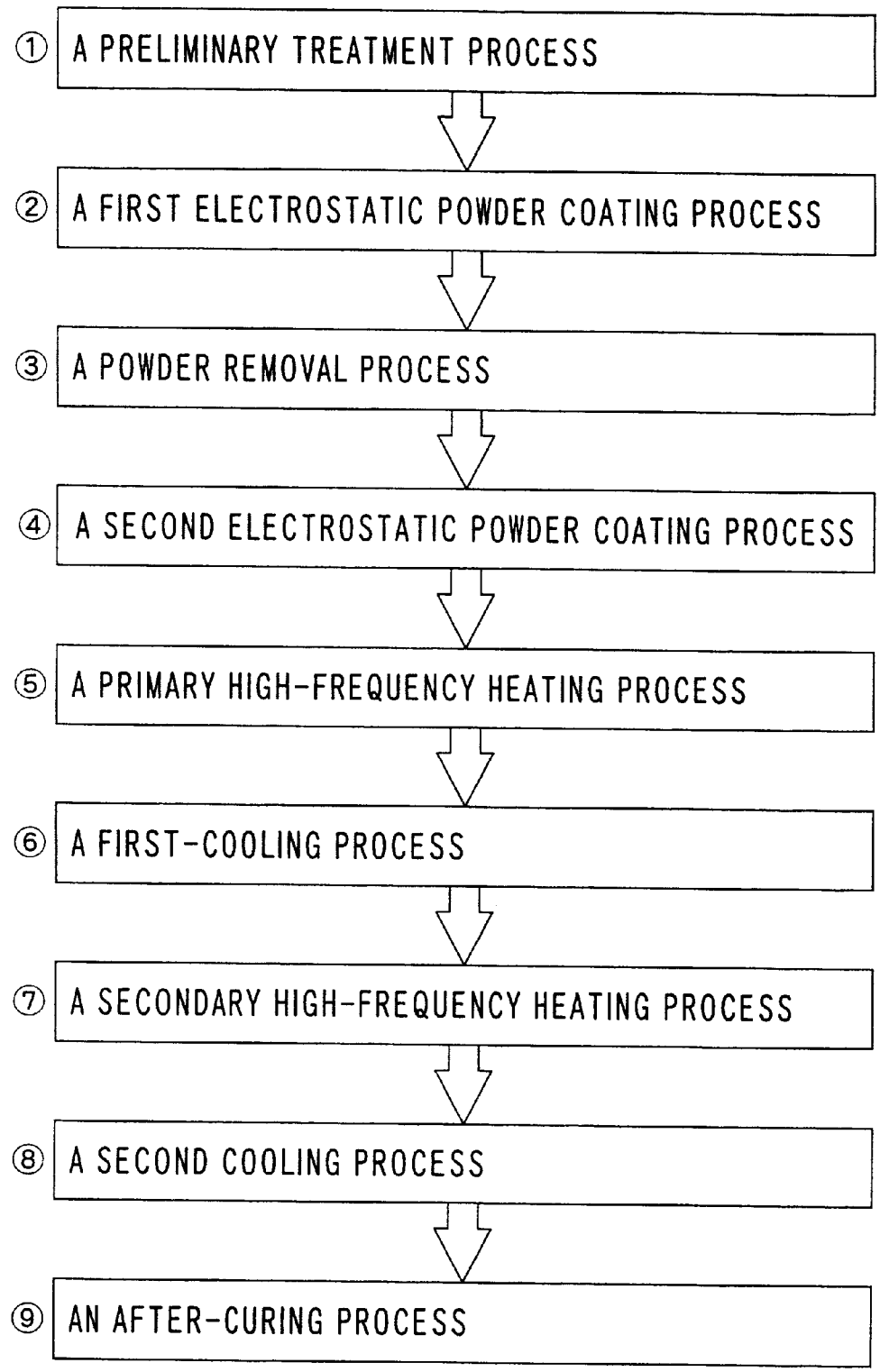
FIG. 3 is a flow chart showing a series of processing steps for forming an electrostatic coated film on the stator core.

Referring to FIG. 3, a method for obtaining such a coated film on the stator core 2 will be described while the electrostatic powder coating apparatus and the holding fixture for holding the stator core 2 for use in the coating process will be described later. As shown in FIG. 3, Step 1 is a preliminary treatment process for the stator core 2. In the preliminary treatment process, adherents such as a press oil and an anticorrosive oil deposited on the surface of the stator core during the assembling of the stator core 2 are removed before the coating is applied, so as not to impair the stability and the adhesion of the electrical insulating film 12. In the preliminary treatment process, the stator core 2 having the adherents is heated for a predetermined period of time by storing it in a chamber under a heated-air convective or an infrared radiative atmosphere controlled to have such a temperature that to dissolve or evaporate the adherents while the core material is not oxidized.

Figure 4:
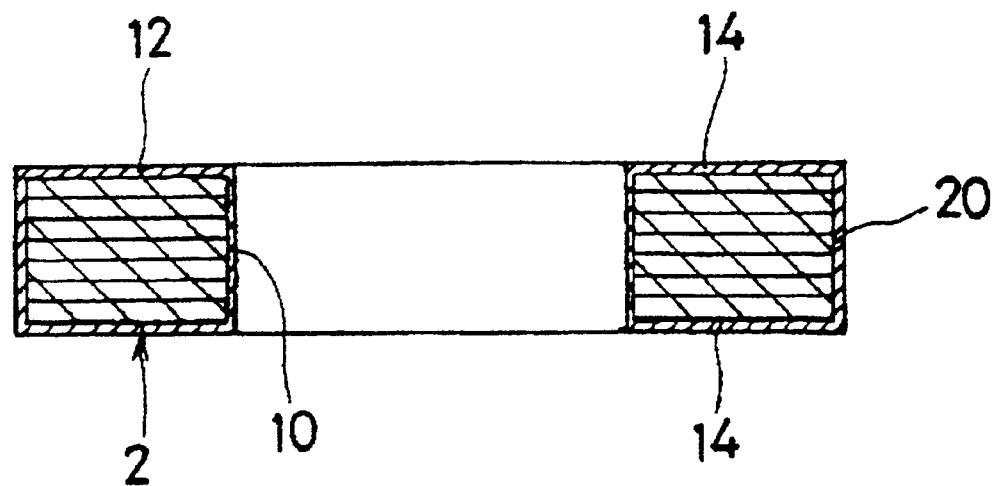
FIG. 4 is a sectional view showing the stator core at the state after a first electrostatic powder coating step.

After Step 1, the stator core 2 is cooled to room temperature and is transported to Step 2 station for a first electrostatic powder coating process. At Step 2, the stator core 2 held by the holding fixture moves within an electrostatic powder-spray station while rotating integrally with the holding fixture. The stator core 2 is coated by electrostatic powder coating means during the movement in the electrostatic powder-spray station. When the stator core 2 has passed through Step 2 station, substantially the entire surface of the stator core 2 (both end faces 14 of the stator core 2, the slot defining surfaces 18, the outermost peripheral surfaces 20 of the teeth 8, and the internal peripheral surface of the mounting hole 10) is coated with the electrical insulating film or layer 12 having a first predetermined thicknesses of 30 to 50 $\mu$m (micrometers) as shown in FIG. 4.

Figure 5:
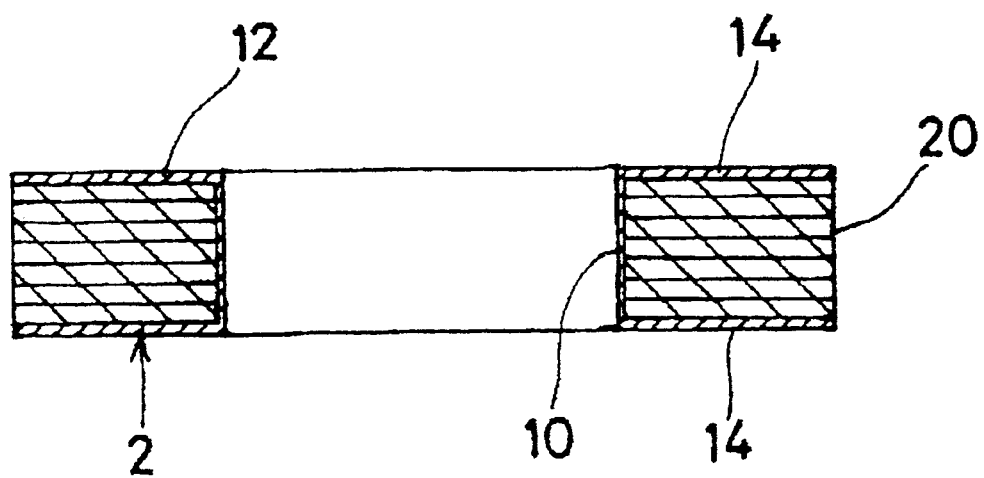
FIG. 5 is a sectional view showing the stator core at the state after a partial powder removal step.

After Step 2, the stator core 2 is transferred to Step 3 station for a powder removal process while rotating in a state of being held by the holding fixture. At Step 3, the stator core 2 held by the holding fixture and rotating therewith moves inside a powder removal station. During the movement of the stator core 2 in the powder removal station, the coated films on the outermost peripheral surfaces 20 of the teeth of the stator core 2 are removed by powder removing means which will be described below. At Step 3, as shown in FIG. 5, only the electrical insulating coating film 12 on the outermost peripheral surface 20 of each tooth 8 is removed while the other places of the stator core 2 (both end faces 14 of the stator core 2, the slot prescribed surfaces 18, and the internal peripheral surface of the mounting hole 10) remain in the state of being coated.

After Step 3, the stator core 2 is conveyed to Step 4 station for a second powder coating process while rotating in a state of being held by the holding fixture. At Step 4, the rotating stator core 2 held by the holding fixture moves within the electrostatic powder-spray station of which structure and process are the same as those of Step 2. After Step 4, substantially the entire surface of the stator core 2 (both end faces 14 of the stator core 2, the slot prescribed surfaces 18, the outermost peripheral surfaces 20 of the teeth 8, and the internal peripheral surface of the mounting hole 10) is coated with the electrical insulating film 12 having second fixed film thicknesses of 20 to 50 $\mu$m (micrometers).

After Step 4, as shown in FIG. 2, the thickness "T1" of the electrical insulating coating film 12 on both end faces 14 of the stator core 2 and the slot defining surface 18 is the sum of the film thickness formed in the first powder coating process and the film thickness formed in the second powder coating process, thereby becoming comparatively larger in thickness. Therefore, on both end faces 14 of the stator core 2 and the slot defining surface 18 coated with the electrical insulating coating film 12 having the thickness "T1", the electric insulation from the coils wound therearound is sufficiently secured while the surfaces are securely inhibited from rust-generation.

On the other hand, as shown in FIG. 2, the thickness "T2" of the electrical insulating coating film 12 on the outermost peripheral surfaces 20 of the teeth 8 is only the film thickness formed in the second powder coating process, thereby becoming comparatively smaller in thickness. Therefore, on the outermost peripheral surfaces 20 of the stator core 2 coated with the electrical insulating film 12 with the thickness of "T2", those surfaces are securely inhibited from rust-generation, although the electrical insulating characteristics are inferior than those in the region coated with the electrical insulating coating film 12 having the thickness "T1". The smaller thickness "T2" of the electrical insulating coating film 12 on the outermost peripheral surfaces 20 of the teeth 8 enables reduction of the gap in the radial direction between the outermost peripheral surfaces 20 that are the inside of the coated film, and the internal surfaces of driving magnets (not shown) when the stator core is assembled in the motor, so that the magnetic reluctance between the stator and the driving magnets is reduced, resulting in higher efficiency in the motor with small size of the motor.

After Step 4, the stator core 2 is conveyed to Step 5 station for a primary high-frequency heating process while rotating in a state of being held by the holding fixture. At Step 5, the rotating stator core 2 held by the holding fixture moves between skid coils of a known high-frequency heater. During the movement of the stator core 2 between the skid coils, the stator core 2 is heated under an atmosphere at a temperature of about 150° C. from room temperature for 20 to 40 seconds. When the stator core 2 is heated in this manner after Step 4, particles forming the electrical insulating film 12 are melted.

After Step 5, the stator core 2 is conveyed to Step 6 station for a first cooling process while rotating in a state of being held by the holding fixture. At Step 6, the rotating stator core 2 held by the holding fixture is cooled. The molten paint particles on the stator core 2 at the state after Step 5 are solidified by being cooled to a temperature below the melting point of the paint particles to form a coated layer on the surface of the stator core. After the cooling, compressed air is blasted onto the holding fixture holding the stator core 2 and its vicinity so as to remove excess powder paint adhering thereto.

After Step 6, the stator core 2 is conveyed to Step 7 station for a secondary high-frequency heating process while rotating in a state of being held by the holding fixture. At Step 7, the rotating stator core 2 held by the holding fixture moves between skid coils of high-frequency heater which is similar to that used in Step 5. After Step 6, the stator core 2 is heated again to a temperature between 200 and 230° C. for 20 to 40 seconds. After passing through between the skid coils, the stator core 2 is forcedly cooled to room temperature by a blast of compressed air or a blower after Step 8 (a cooling process), and excess powder paint adhering to the holding fixture and the stator core 2 is removed simultaneously.

After Step 8, the stator core 2 is transferred to Step 9 station for an after-curing process while rotating in a state of being held by the holding fixture. At Step 9, the rotating stator core 2 held by the holding fixture is subjected to various treatments. After Step 8, the stator core 2 is treated under atmospheres in which the temperature is raised to about 240° C. in one minute, is held at this state for three minutes, and is lowered to room temperature in seven minutes, for example. The coated film or layer of the stator core 2 which received such various treatments, will have equalized thickness, stabilized quality, and excellent film hardness. After Step 9, the stator core 2 is removed from the holding fixture and a desired stator core as shown in FIGS. 1 and 2 is obtained.

Figure 6:
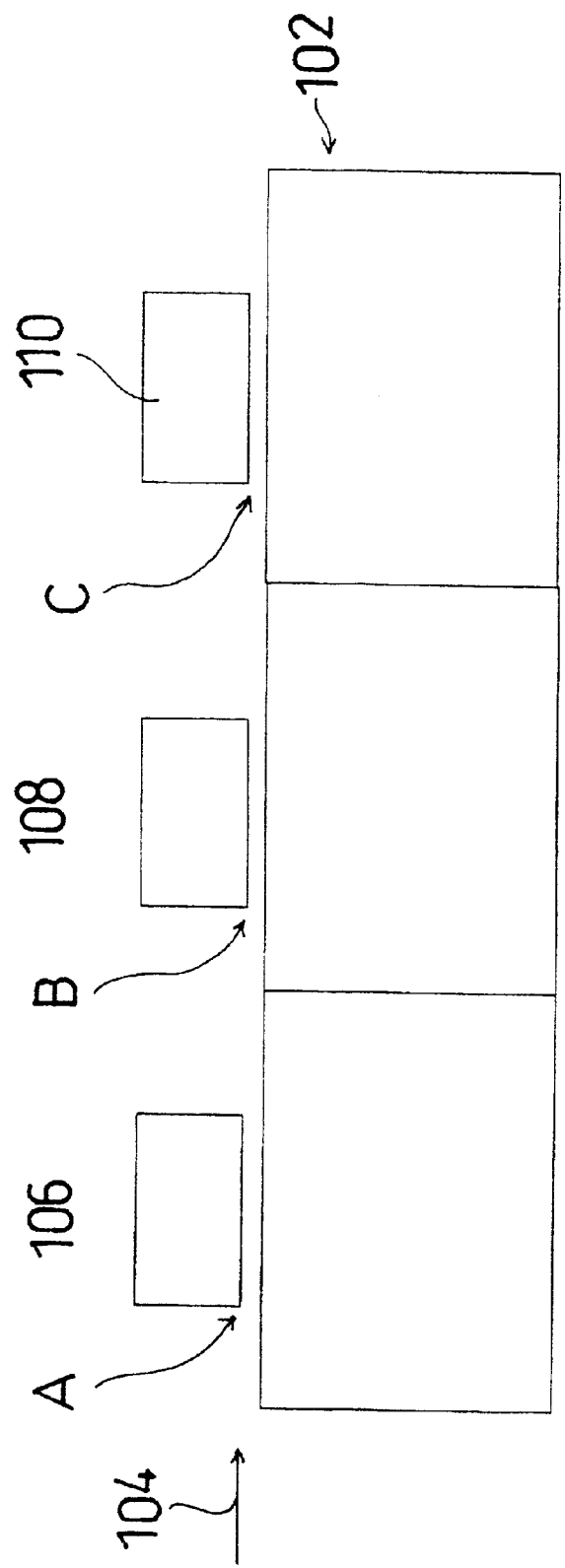
FIG. 6 is a schematic illustration showing the electrostatic powder spray apparatus according to the embodiment of the present invention.
Figure 7A:
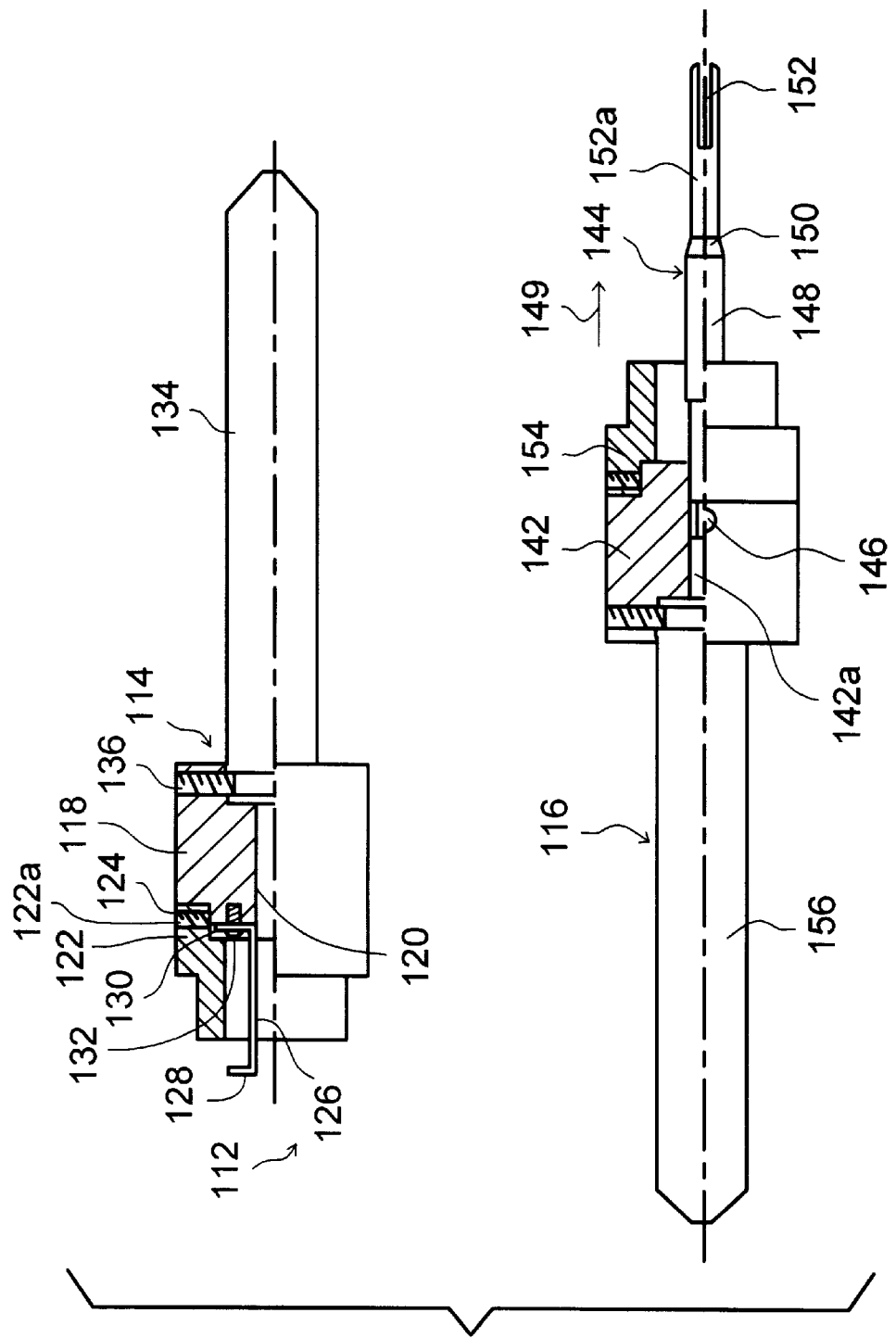
FIG. 7A shows partially sectional views of a holding fixtures for the electrostatic powder coating apparatus shown in FIG. 6.
Figure 7B:
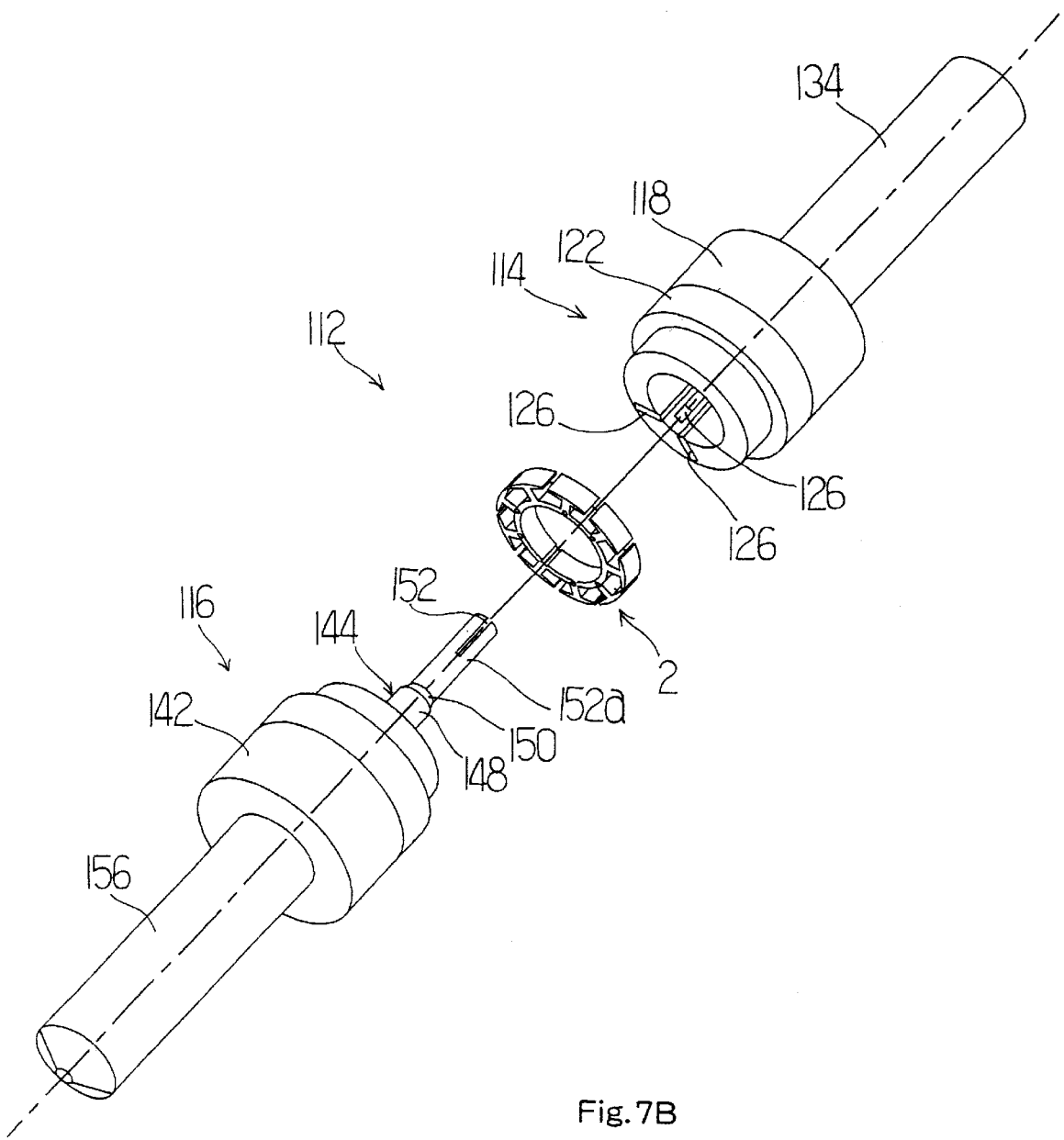
FIG. 7B is an exploded view showing the positional relationship between the stator core and the holding fixture.
Figure 8:
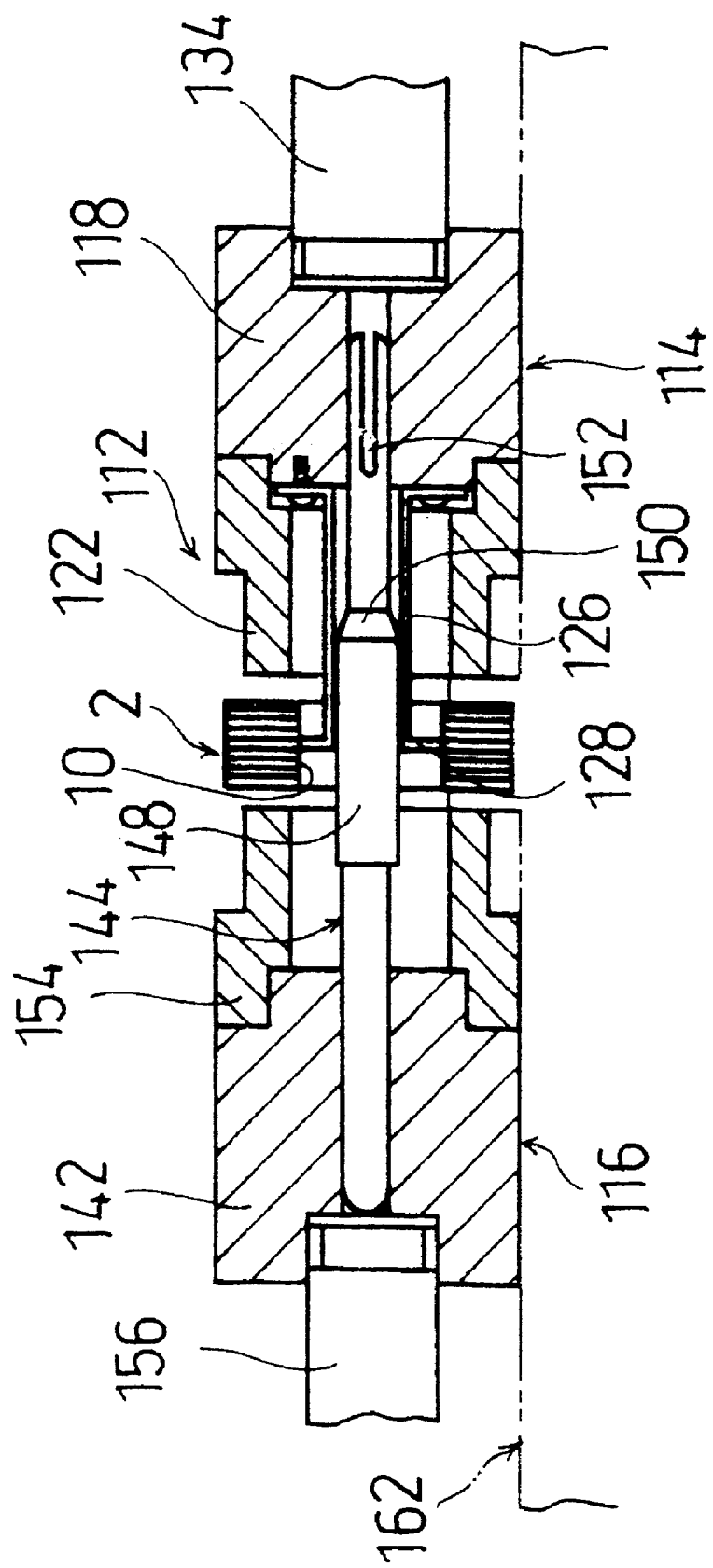
FIG. 8 is a partial sectional view showing the state of the stator core held by the holding fixture.
Figure 9A:
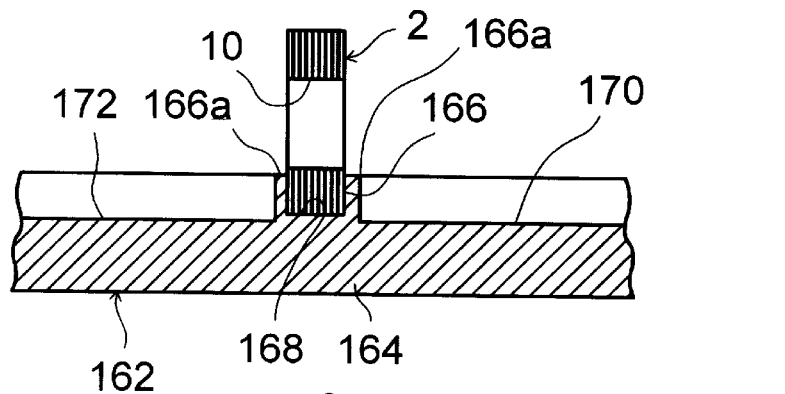
FIGS. 9A through 9C are partial sectional views for showing process of connecting the first fixture to the second fixture.
Figure 9B:
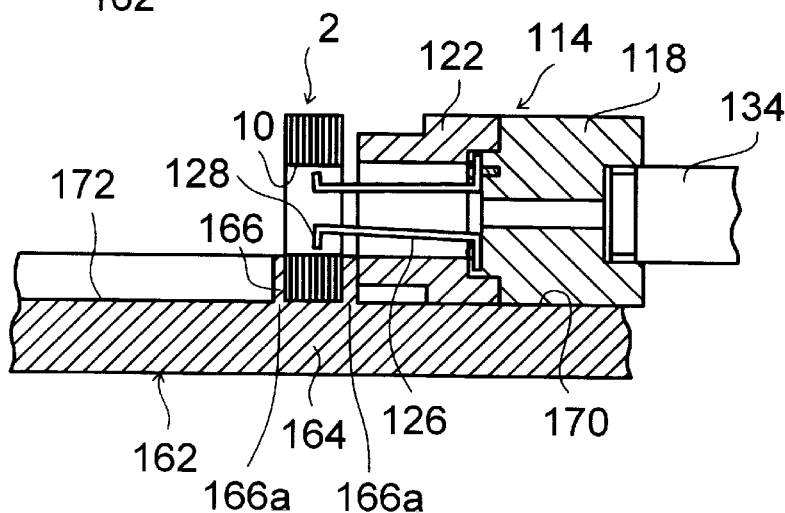
Figure 9C:
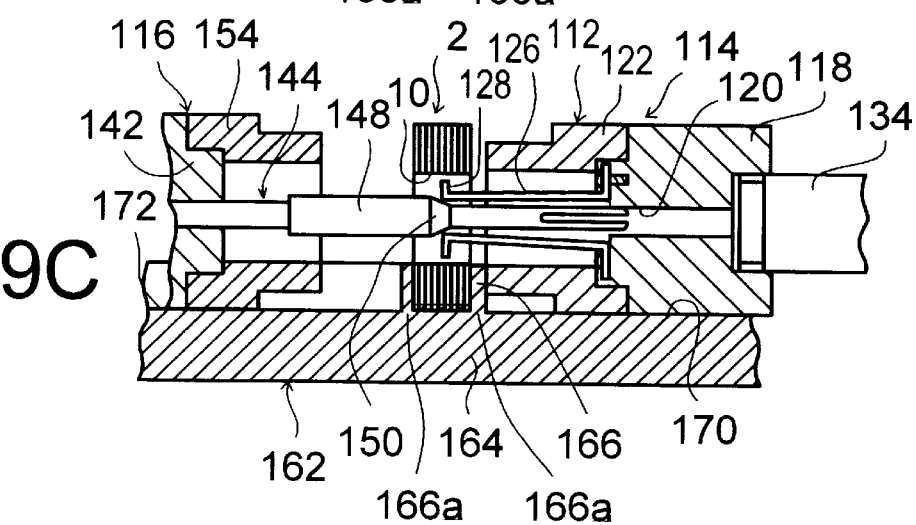

Next, the electrostatic powder spray apparatus for performing the process of Steps 2 to 4 will be described with reference to FIGS. 6 to 9. FIG. 6 is a schematic illustration showing the electrostatic powder coating apparatus according to an embodiment of the present invention. FIG. 7A is a front view of a holding fixture for the electrostatic powder coating apparatus shown in FIG. 6, with its upper half being shown in cross section and the lower half being shown in an outer appearance thereof. FIG. 8 is a partial sectional view showing the state of the stator core held by the holding fixture. FIGS. 9A to 9C are partial sectional views for showing operations to hold the stator core by the holding fixture.

The electrostatic powder coating apparatus comprises a holding fixture, transporting means, electrostatic powder coating means, and powder removing means which will be described later in more detail. As shown in FIG. 6, the apparatus includes a main body 102 which is installed on a floor of a factory or the like. On the main body 102 is provided a first electrostatic spray region "A", a powder removal region "B", and a second electrostatic spray region "C" along the direction of transporting a stator core to be coated, as shown by an arrow 104. The first electrostatic spray region "A" is provided with an electrostatic powder coating means 106 for performing Step 2 (the first electrostatic powder coating process). The powder removal region "B" is provided with a powder removing means 108 for performing Step 3 (the powder removal process). The second electrostatic spray region "C" is provided with electrostatic powder coating means 110 for performing Step 4 (the second electrostatic powder-coating process).

The electrostatic powder coating means 106 and 110 of respective the first and second electrostatic spray regions "A" and "C" may have substantially the same structure as each other. The electrostatic powder coating means 106 and 110 are formed of a frictional charging type powder coating machine, in which powder particles are ejected to an article to be coated, as disclosed in Japanese Laid-Open Patent Application No. 10-145988, for example; the entire content of which is hereby incorporated by reference.

The powder removing means 108 has a remover such as a blade or a brush which is brought into contact with a rotating article to be coated, in a manner not to stop the rotation, for example.

The transporting means includes a pair of transporting screws (not shown) which extend in parallel with each other. The pair of transporting screws are arranged on the main body 102 along the first electrostatic spray region "A", the powder removing region "B", and the second electrostatic spray region "C". When the pair of transporting screws are rotated, the holding fixture 112 (see, e.g., FIGS. 7A, 7B, and 8) holding the stator core 2 and mounted on the screws, moves along the first electrostatic spray region "A", the powder removing region "B", and the second electrostatic spray region "C" while being rotated by each of the screws. Therefore, the treatments at Steps 2 to 4 are performed as described above while the stator core 2 is transported as described above. After Step 4, the stator core 2 is transported to the high-frequency heater for the treatment at Step 5 in a state of being held by the holding fixture.

Next, the holding fixture 112 for holding the stator core 2 will be described with reference to FIGS. 7A and 7B, and FIG. 8. The holding fixture 112 is formed of a first and second fixtures 114 and 116 that are detachably connected to each other.

The first fixture 114 comprises a first cylindrical member 118 made of a conductive metal such as brass. A through-hole 120 extending in the axial direction is formed in the first fixture 114. To one end of the first cylindrical member 118 (on the left of FIGS. 7A to 8) is fixed a protecting sleeve 122 composed of a synthetic resin such as Teflon. A screw hole 122a extending in the radial direction is formed on the peripheral surface of the protecting sleeve 122, at a position close to one end thereof (on the right of FIGS. 7A to 8). In other words, the screw hole 122a extends through the cylindrical wall of the protecting sleeve 122 from its outer surface to the interior hollow. A screw 124 is fitted into the screw hole 122a, and the protecting sleeve 122 is fixed to the cylindrical member 118 making the tip of the screw 124 abut against the external surface of the cylindrical member 118 while the protecting sleeve 122 is fitted on the smaller diameter annular portion of cylindrical member 118. Three holding hooks 126 are respectively fixed by a screw to one end surface of the cylindrical member 118 at equal intervals with respect to the peripheral direction. These holding hooks 126 are made of elastic metal and extend in the axial direction from one end of the cylindrical member 118 where the holding hook is fixed, such that the free ends of the holding hooks protrude from the opening of the protecting sleeve 122. Furthermore, those holding hooks 126 are in the shape of slim pieces of plates or strips having mounting portions 130 formed at one ends to be fixed to the cylindrical member 118 by screws 132 and hook portions 128 extending in the outer radial direction at the other ends (at the free-end). Each hook portion 128 extends so that the plate thereof tapers down to a narrow tip. These holding hooks 126 are made of stainless steel (SUS 303, for example), phosphor bronze, or the like. In particular, according to an experiment performed by the inventors of the present invention, when a phosphor bronze was used for the hook portion 128, good electrical conductivity was obtained between the stator core 2 and the holding hooks 126 to ensure grounding of the stator core 2, thereby achieving the substantially equal thickness of the electrical insulating coating film or layer 12 formed on the stator core 2. In addition, the number of the holding hooks 126 is three in this embodiment; however, the number may be two, four, or more. The tip of each hook portion 128 may be sharp-pointed.

To the other end of the first cylindrical member 118 (on the right in FIGS. 7A to 8) is fixed a rod 134 for transportation of the first fixture. In the opening of the through-hole 120 of the cylindrical member 118 on the other end thereof, a larger internal-diameter-portion having a larger internal diameter than that of the through-hole 120 is formed. On the peripheral surface of the larger internal-diameter-portion, a screw hole extending in the radial direction is formed.

A screw 136 is fitted in the screw hole, and the rod 134 for transportation is fixed to the cylindrical member 118 by making the tip of the screw 136 abut against the external surface of the rod for transferring 134 with one end portion (on the left in FIGS. 7A to 8) of the rod for transferring 134 being fitted into the larger internal-diameter-portion of the cylindrical member 118. The rod for transportation 134 is made of a conductive metallic material such as brass. The rod for transportation 134 moves on the transportation screws while being rotated by the action of the transportation screws.

On the other hand, the second fixture 116 comprises a second cylindrical member 142 made of a metal such as brass. A through-hole 142a extending in the axial direction is formed in the second cylindrical member 142. At the intermediary of the second cylindrical member 142 is formed a screw hole extending through the cylindrical wall in the radial direction. To one end of the second cylindrical member 142 (on the right in FIGS. 7A to 8), a connecting rod 144 is fixed. A screw 146 is fitted into the screw hole, and the connecting rod 144 is fixed to the second cylindrical member 142 by making the tip of the screw 146 abut against the external surface of the connecting rod 144 with the connecting rod 144 being fitted into the through-hole 142a. The connecting rod 144 is formed of a base portion which is to be fitted to the through-hole 142a, a hook-acting portion 148 having a larger diameter than that of the base portion, a taper portion 150 tapering down from the hook-acting portion 148 in the direction of an arrow 149 (the arrow 149 shows a direction which the second fixture 116 moves to the first fixture 114), and a small diameter end portion 152a extending from the smaller diameter portion of the taper portion 150 to the tip. A slit 152 is longitudinally formed at the tip of the small diameter end portion 152a, so that the small diameter end portion 152a is slightly expanded radially outward. In addition, the connecting rod 144 may be formed integrally with the second cylindrical member 142.

On one end of the second cylindrical member 142 is fixed, a protecting sleeve 154 made of a synthetic resin such as Teflon and having the same shape as that of the protecting sleeve 122 of the first fixture 114 described above. The protecting sleeve 154 is fixed to the second cylindrical member 142 in the same manner as the protecting sleeve 122 is fixed to the first cylindrical member 118. The hook-acting portion 148 and the small diameter end portion 152a of the connecting rod 144 protrude from one end of the protection sleeve 154 (on the right in FIGS. 7A to 8), with sufficient space being left between the connecting rod 144 and the internal surface of the protecting sleeve 154.

On the other end of the second cylindrical member 142 is fixed a rod 156 for transportation which has the same shape as that of the rod 134 for transportation of the first fixture described above. The rod 156 is fixed on the second cylindrical member 142 in the same manner as that for fixing the rod 134 on the first cylindrical member 118. The rod 156 for transportation moves on the transportation screw while being rotated by the action of the transportation screws.

Next, a method for holding the stator core 2 by the holding fixture 112 will be described with reference to FIGS. 8 to 9C. In order to hold the stator core by the holding fixture 112, as shown in FIGS. 9A to 9C, a fittingujig 162 is used. The fitting jig 162 is formed of a jig body 164 of a long and narrow shape for supporting the holding fixture 112 and the stator core 2, and a holding portion 166 for holding the stator core 2 on the top surface of the jig body 164 at an intermediate position in the longitudinal direction (from right to left ends in FIG. 8). The holding portion 166 comprises a holding concave portion 168 formed by a pair of vertical walls 166a confronting each other with a space or interval therebetween corresponding to the thickness of the stator core 2 to be held. The heights of the pair of wall portions 166a are determined not to cover the mounting hole 10 of the stator core 2 when the stator core 2 is held by the holding portion 166. On one side of the jig body 164 with respect to the holding portion 166 (on the right of the holding portion 166 in FIGS. 9A to 9C), is formed a first supporting guide portion 170 for guiding the first fixture 114 while on the other side thereof is formed a second supporting guide portion 172 for guiding the second fixture 116.

Before being held by the holding fixture 112, the stator core 2 is received in the holding portion 166 of the fitting jig 162, as shown in FIG. 9A. The lower part of the stator core 2 is received in the holding portion 166 while the mounting hole 10 thereof is positioned above the holding portion 166.

Next, as shown in FIG. 9B, the first fixture 114 is placed on the first supporting guide portion 170 of the fitting jig 162 so that the holding hooks 126 face the stator core 2. Then, the first fixture 114 is moved along the first supporting guide portion 170 until the protecting sleeve 122 thereof abuts the holding portion 166 of the fitting jig 162. The hook portions 128 of the plural holding hooks 126 of the first fixture 114 are positioned within the mounting hole 10 of the stator core 2 held by the holding portion 166 with the hook portions 128 loose-fitting the mounting hole 10.

A space corresponding to the thickness of the wall portion 166a is defined between one end face of the stator core 2 (the right face of the stator core 2 in FIGS. 9A to 9C) and the end face of the protecting sleeve 122 of the first fixture 114. In addition, the diameter of a hypothetical circle defined by the tips of the hook portions 128 of the plural holding hooks 126 is slightly smaller than the internal diameter of the mounting hole 10 of the stator core 2, so that these holding hooks 126 do not touch the stator core 2 while the first fixture 114 is being moved a predetermined engaging position where the end of the protecting sleeve 122 of the first fixture 114 is in contact with the stator core 2.

Next, as shown in FIG. 9C, the second fixture 116 is placed on the second supporting guide portion 172 of the fitting jig 162 such that the connecting rod 144 faces the stator core 2. Then the second fixture 116 is moved along the second supporting guide portion 172 until the protecting sleeve 154 thereof abuts the holding portion 166 of the fitting jig 162. The end portion of the connecting rod 144 of the second fixture 116 passes through the mounting hole 10 of the stator core 2 held by the holding portion 166 while loose-fitting the mounting hole 10. Then, the end portion of the connecting rod 144 of the second fixture 116 moves into hypothetical circle defined by the plural holding hooks 126 which have been disposed within the mounting hole 10 and the end portion is slightly inserted into the through-hole 120 of the first fixture 114. Simultaneously, the taper portion 150 of the connecting rod 144 abuts these holding hooks 126 to elastically increase the diameter of the circle defined by the holding hooks 126 in the outer radial direction. In other words, the holding hooks 126 are elastically pushed and expands radially outwards. Thereby, the hook portions 128 of these holding hooks 126 elastically abut against the internal surface of the mounting hole 10 of the stator core 2. At this time, only the tip of each hook portion 128 makes line or point-contact with the internal surface thereof.

Furthermore, when the second fixture 116 is moved to the position where the protecting sleeve 154 thereof abuts the holding portion 166 of the fitting jig 162, as shown in FIG. 8, the tip portion of the connecting rod 144 is inserted into the through-hole 120 of the first fixture 114. The tip portion of the connecting rod 144 is so formed that both sides of the slit 152 (i.e., the bifurcated portions) are slightly biased radially outwards so that the internal surface of the through-hole 120 urges the tip portion to elastically deform slightly in the radially inner direction. Thus, the tip is detachably fitted into the through-hole 120. Therefore, even when the holding fixture 112 holding the stator core 2 is rotated during the movement, the first and second fixtures 114 and 116 are not detached from each other.

The hook-acting portion 148 of the connecting rod 144 abuts against the holding hooks 126 for the portion thereof from its hook portions 128 to the intermediary portions of so that the hook portions 128 expand in the outer radial direction to thereby ensure and maintain the position of the hook portions 128. Thus, the hook portions 128 of the plural holding hooks 126 are maintained at the state where they elastically abut the internal peripheral surface of the mounting hole 10 of the stator core 2. At this time, a space corresponding to the thickness of the wall portion 166a is defined between the other end face of the stator core 2 and the end face of the protecting sleeve 154 of the second fixture 116.

The stator core 2 held by the holding fixture 112 as described above can be detached from the fitting jig 162 by raising the holding fixture 112 upwardly. At this time, the stator core 2 is held without being covered by the holding fixture 112. Thus the stator core 2 is set on the electrostatic coating apparatus and is transferred to Step 2 station for the first electrostatic powder coating process.

Paint powder or particles electrically charged in the first and the second electrostatic powder coating process are ejected onto the stator core 2 held by the holding fixture 112 as described above, so that the paint particles reach not only both end faces 14, the slot prescribed surface 18, and the outermost peripheral surface 20 of each tooth 8 of the stator core 2, but also the internal surface of the mounting hole 10 because the mounting hole 10 is not blocked or covered by the holding fixture 112, and a space is left between the stator core 2 and the end surfaces of the protecting sleeves 122 and 154 of the holding fixture 112. In addition, it is preferable that the space be 1 to 2 mm, for example. The thickness of the electrical insulating coating film or layer 12 formed on the internal surface of the mounting hole 10 can be adjusted by adjusting the dimension of the space.

When the above-described Step 9 is finished, the stator core 2 is removed from the holding fixture 112. A method for removing the holding fixture 112 from the stator core is as follows. The first and second fixtures 114 and 116 are moved in the opposite directions from each other to be spaced apart. When the connecting rod 144 is removed from the holding hooks 126, the hook portions 128 of the holding hooks 126 resume their original positions, moving in the radially inner directions from the position abuting against the internal surface of the mounting hole 10 of the stator core 2. Then, the stator core 2 are disengaged from these holding hooks 126, and the stator core 2 can be removed from the holding fixture 112 by further spacing apart the first and second fixtures 114 and 116 from each other.

In this embodiment, at least one of the fixtures of the holding fixture 112, the first fixture 114, for example, is electrically grounded to the main body of the coating apparatus 102. Therefore, the stator core 2 as an article to be coated is electrically connected to the transferring screws (coating apparatus body 102) through the plural holding hooks 126, the first cylindrical member 118, and the rod for transferring 134 to be grounded, so that charged paint particles are electrostatically deposited on the stator core 2. In addition, when the second fixture 116 is grounded to main body of the coating apparatus 102, the stator core 2 is electrically connected to the transferring screws (spray apparatus body 102) through the plural holding hooks 126, the connecting rod 144, the second cylindrical member 142, and the rod for transferring 156 to be grounded.

An embodiment of a holding fixture and an electrostatic powder coating apparatus according to the present invention has been described as above. However, the scope of the present invention is not limited to the embodiment; various changes and modifications may be made.

For example, in the embodiment described above, the first and second electrostatic spray regions "A" and "C" of the coating apparatus 102 are spaced on the coating apparatus 102 in the same direction along the movement of an article to be coated. However, the electrostatic spray region may be arranged at one spot on the coating apparatus 102 so that an article to be coated moves to and from the electrostatic spray region to pass therethrough two times.

Also, in the embodiment described above, the article to be coated has been described in the context of the stator core of an electric motor having a coated film or layer of the thickness which differs with region of the stator core, the number of the powder spray processes or powder removing processes may be changed according to the desired variation of the film thickness. In contrast, when the different thickness of the coated film is not required, the powder removing process and the second powder spray process may be dispensed with.

Also, in the embodiment described above, the core forming the stator has been described as an article to be coated. However, the article is not limited to it, and the invention may be applied to electrostatic coating on a core forming a rotor, a driving magnet of a motor, or a clamping magnet of a recording disc used in a driving apparatus for a recording disc. It is also be recognized the article to be coated may not be limited to such a part of an electric motor, but may be various other articles which have a ring shape and which are required to be coated on their inner surfaces as well as outer surface.

What is claimed is:

1. An electrostatic powder coating apparatus for coating electrostatically charged powder on a ring-shaped article having an inner surface defining a central hole, the apparatus comprising:

a holding fixture which comprises a first fixture having a plurality of holding hooks circularly arranged and elastically deformable radially, and a second fixture having a rod, the first and second fixtures being inserted through the central hole of the article from opposite sides to engage each other, with the rod engaging the holding hooks to elastically deform the hooks and bring them into abutment with the inner surface of the article; and electrostatic powder spray for spraying electrostatically charged powder onto the annular article held by said holding fixture.

2. An electrostatic powder coating apparatus according to claim 1, wherein each of the holding hooks has a hook portion having a tip which is small in area and which is to be brought into abutment with the inner surface.

3. An electrostatic powder coating apparatus according to claim 2, wherein the tip of the hook portion is pointed.

4. An electrostatic powder coating apparatus according to claim 1, wherein the first fixture includes a hole for receiving the rod of the second fixture to couple the first and second fixtures.

5. An electrostatic powder coating apparatus according to claim 4, wherein the first and second fixtures respectively have an end surface which confronts the article when the fixtures are coupled with each other to hold the article, and the fixtures further comprise means for restricting the relative position of the fixtures at their coupled condition such that spaces are formed between the end surfaces and the article.

6. An electrostatic powder coating apparatus according to claim 1, wherein the first fixture comprises a first cylindrical fixture body, a plurality of holding hooks formed of a material having electric conductivity and elasticity, the holding hooks extending in the longitudinal direction of the fixture body, and being arranged in a hypothetical circle or cylinder, and a connecting hole formed from the end portion of the first fixture body coaxially with a circle defined by the plurality of holding hooks; and wherein the second fixture comprises a second cylindrical fixture body, and a bar-shaped connecting rod extending in the longitudinal direction of the second fixture body, the connecting rod having a first portion to be inserted into the connecting hole and a second portion to engage the holding hooks to elastically deform the latter and bring them into contact with the inner surface of the article to hold the article.

7. An electrostatic powder coating apparatus according to claim 1, further comprising a conveyer for transporting the article held by the holding fixture through the electrostatic powder spray.

8. An electrostatic powder coating apparatus according to claim 7, further comprising a coated layer removing station for removing the film coated on a specific region of the article coated by the electrostatic powder spray, and a second electrostatic powder spray for spraying electrostatically charged powder on the article, said first and second fixtures respectively having a carrier to be supported by the conveyer such that the fixtures holding the article are transported by the conveyer with the fixtures rotating integrally with the article.

9. An electrostatic powder spray apparatus according to claim 1, wherein the electrostatic powder spray comprises a first spray means for spraying electrostatically charged powder onto the article for a first time, and a second spray means for spraying electrostatically charged powder onto the article for a second time, and further comprising a coated film removing means for removing a first coated layer on a predetermined region of the article before applying a second coating layer thereon.

10. An electrostatic powder spray apparatus for coating electrostatically charged powder on a ring-shaped article having an inner surface defining a central hole, the apparatus comprising:

a holding fixture which comprises a first fixture having a plurality of holding hooks circularly arranged and elastically deformable radially, and a second fixture having a rod, the first and second fixtures being inserted through the central hole of the article from opposite sides to engage each other, with the rod engaging the holding hooks to elastically deform the hooks and bring them in abutment with the inner surface of the article;

a first electrostatic powder spray station for spraying electrostatically charged powder onto the article held by said holding fixture;

a coated layer removing station for removing a layer of the powder coated at the first electrostatic powder spray station from a particular portion of the article;

a second electrostatic powder spray station for spraying electrostatically charged powder onto the article from the coated layer removing station; and a conveyer for transporting the article through the first and second electrostatic powder spray stations and the coated layer removing station.

11. A holding fixture for holding a ring-shaped article having an inner surface defining a central hole while the article receives a treatment, the holding fixture comprising:

a first fixture having a plurality of holding hooks circularly arranged and elastically deformable radially, each of the hooks having a pointed tip extending radially outwards; and a second fixture having a rod, the first and second fixtures being inserted through the central hole of the article from opposite sides to engage each other, with the rod engaging the holding hooks to elastically deform the hooks and bring the tips into abutment with the inner surface of the article.

12. A holding fixture according to claim 11, wherein the first fixture comprises a hole for receiving the rod of the second fixture to couple the first and second fixtures.

13. A holding fixture according to claim 12, wherein the first fixture comprises a first cylindrical fixture body, a plurality of holding hooks formed of a material having electric conductivity and elasticity, the holding hooks extending in the longitudinal direction of the fixture body, and being arranged in a hypothetical circle or cylinder, and a connecting hole formed from the end portion of the first fixture body coaxially with a circle defined by the plurality of holding hooks; and wherein the second fixture comprises a second cylindrical fixture body, and a bar-shaped connecting rod extending in the longitudinal direction of the second fixture body, the connecting rod having a first portion to be inserted into the connecting hole and a second portion to engage the holding hooks to elastically deform the latter and bring them into contact with the inner surface of the article to hold the article.

14. A holding fixture for holding a ring-shaped stator core for an electric motor while the stator core is coated with electrostatically charged powder, the stator core having an inner surface defining a central hole, the holding fixture comprising:

a first fixture having a plurality of holding hooks circularly arranged and elastically deformable radially, each of the hooks having a pointed tip extending radially outwards; and a second fixture having a rod, the first and second fixtures being inserted through the central hole of the article from opposite sides to engage each other, with the rod engaging the holding hooks to elastically deform the hooks and bring the tips into abutment with the inner surface of the stator core.

15. An electrostatic powder spray apparatus for coating electrostatically charged powder on a stator core for an electric motor, the stator core having an annular base portion with an inner surface defining a central hole, and a plurality of teeth extending radially outwards from the base portion, the apparatus comprising:

a holding fixture which comprises a first fixture having a plurality of holding hooks circularly arranged and elastically deformable radially, and a second fixture having a rod, the first and second fixtures being inserted thorough the central hole of the article from opposite sides to engage each other, with the rod engaging the holding hooks to elastically deform the hooks and bring them in abutment with the inner surface of the stator core;

a first electrostatic powder spray station for spraying electrostatically charged powder onto the stator core held by said holding fixture;

a coated layer removing station for removing a layer of the powder coated at the first electrostatic powder spray station from the outermost portion of the teeth of the stator core;

a second electrostatic powder spray station for spraying electrostatically charged powder onto the stator core from the coated layer removing station; and a conveyer for transporting the stator core through the first and second electrostatic powder spray stations and the coated layer removing station.

* * * * *